United States Patent [19]

Suzuki et al.

[11] Patent Number: 5,045,679
[45] Date of Patent: Sep. 3, 1991

[54] OPTICAL PATH ADJUSTING SYSTEM WITH DUAL-AXIS WEDGE PRISMS

[75] Inventors: Minoru Suzuki; Kazuo Mera, both of Hitachi, Japan

[73] Assignee: Hitachi, Ltd., Tokyo, Japan

[21] Appl. No.: 443,502

[22] Filed: Dec. 1, 1989

[30] Foreign Application Priority Data

Dec. 9, 1988 [JP] Japan ................. 63-310036

[51] Int. Cl.$^5$ ................. G01J 1/20
[52] U.S. Cl. ................. 250/201.1; 250/206.2
[58] Field of Search ............ 219/121.78, 121.79, 219/121.8, 121.81; 350/6.4; 250/234, 216, 201.1, 203.1, 206.1, 206.2

[56] References Cited

U.S. PATENT DOCUMENTS

| | | | |
|---|---|---|---|
| 4,190,759 | 2/1980 | Hongo et al. | 219/121.79 |
| 4,515,447 | 5/1985 | Weimer et al. | 350/6.4 |
| 4,822,974 | 4/1989 | Leighton | 219/121.8 |
| 4,850,686 | 7/1989 | Morimoto et al. | 350/6.4 |

Primary Examiner—David C. Nelms
Attorney, Agent, or Firm—Antonelli, Terry, Stout & Kraus

[57] ABSTRACT

In an optical path adjusting system, an x-axis wedge prism and a y-axis wedge prism are disposed in opposition to each other on the incident optical path side of a condenser lens to which a laser beam is incident so that the x-axis wedge prism and the y-axis wedge prism are displaceable in the directions of x and y axes of a surface of a work respectivley. A position of irradiation of the laser beam on the condenser lens is detected by a detector and the detected position of irradiation is inputted to a controller. The controller supplies a driver with an error correction signal representing an error of the position of irradiation relative to a reference position. The x-axis wedge prism and the y-axis wedge prism are displaced by the driver so that the laser beam is corrected to be parallel to an optical axis of the condenser lens.

12 Claims, 3 Drawing Sheets

OPTICAL PATH ADJUSTING SYSTEM WITH DUAL-AXIS WEDGE PRISMS

BACKGROUND OF THE INVENTION

The present invention relates to an optical path adjusting system for adjusting an optical path of, for example, a laser beam so as to make the laser beam parallel to an optical axis of a condenser lens within the lens.

A laser oscillator, generally, is discharged at an internal electrode to excite a laser medium to thereby generate a laser beam. The laser beam is subjected to resonance amplification between at least a pair of mirrors. The amplified laser beam is transmitted through an output mirror and parallelly emitted therefrom to the outside. The parallel laser beam is reflected by a reflection mirror so as to change the direction thereof perpendicularly and passed through a condenser lens to irradiate a work so that fine working, for example, cutting, welding, or the like, can be performed upon the work. Accordingly, recently, a laser beam is used to perform working, for example, upon electronic parts. In performing working upon electronic parts with a laser beam, the laser beam is adjusted so that a set working position of a work is irradiated with the laser beam so as to perform working accurately.

However, the laser oscillator generates discharge heat due to discharge at the electrode. The temperature of the discharge heat varies in accordance with the degree of working on the work. In accordance with this change of temperature, there is a possibility that various parts of the laser oscillator, the reflection mirror, and so on slightly expand/contract so that the position of irradiation with the laser beam somewhat fluctuates to make it difficult to perform working accurately.

Accordingly, as a mechanism for adjusting the position of irradiation with the laser beam, there has been proposed a trimming apparatus as disclosed in Japanese Laid-Open Patent Publication (JP-A) No. 61-235091. This apparatus is provided with a reference light source, an optical system for inserting reference light emitted from the reference light source into a laser beam path so as to make the respectively optical paths of the reference light and the laser beam coincident with each other, a television camera for detecting the position of irradiation of the reference light as an image signal, and means for comparing actual positional data of the position of irradiation of the reference light with the previously programmed positional data of the position of irradiation of the laser beam so that an error obtained as a result of comparison is rapidly fedback to a deflection device to thereby automatically correct the position of irradiation of the reference light, and for outputting, at the same time, an error detection signal.

In such a configuration, the deflection device is operated so as to make the error zero with respect to the position of irradiation of the reference light. The deflection device is constructed in a manner so that a reflection mirror is attached to an output shaft of an electric motor and the electric motor is driven to rotate forward/backward to deflect the reflection mirror in the left/right direction so as to make the light coincident with the position of irradiation of the reference light. Generally, for example, if the deflection angle (operation angle) is "1", the deflection of light is "2". In other words, when the light is to be deflected by "1", the motor must rotate by the deflection angle of "0.5". Since the deflection angle of the motor is smaller than the deflection of the light, the deflection angle control mechanism must be arranged so as to perform fine angle adjustment with high accuracy. Accordingly, the deflection angle control mechanism is complicated in structure and difficult in operation. For example, when the deflection angle is displayed as an operation scale, it is impossible to enlarge the scale intervals, and it is somewhat difficult to read the scale. Thus, the device is not convenient in operation.

SUMMARY OF THE INVENTION

It is therefore an object of the present invention to provide an optical path adjusting system which is improved in the operation property and which is convenient in operation.

According to the present invention, the optical path adjusting system has a feature in that a displaceable wedge prism is disposed on the incident optical path side of a condenser lens in a manner so that the wedge prism can be displayed by a driving portion.

When a laser beam passes through the condenser lens, if the laser beam is not parallel to the optical axis of the condenser lens, the wedge prism is displaced so as to make the laser beam parallel to the optical axis of the conderser lens, so that the outgoing light from the condenser lens is focused at a point without scattering to thereby obtain a reduced thin laser beam with improved operation property. That is, by use of the wedge prism, a large operation angle can be obtained with respect to a small fine adjustment angle so that the scale intervals of the operation angle can be enlarged and the optical path adjusting system according to present invention has been improved in operation property so as to be convenient in operation.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

Referring to FIGS. 1 through 4, an embodiment of the present invention will be described hereunder.

Figure 1A:
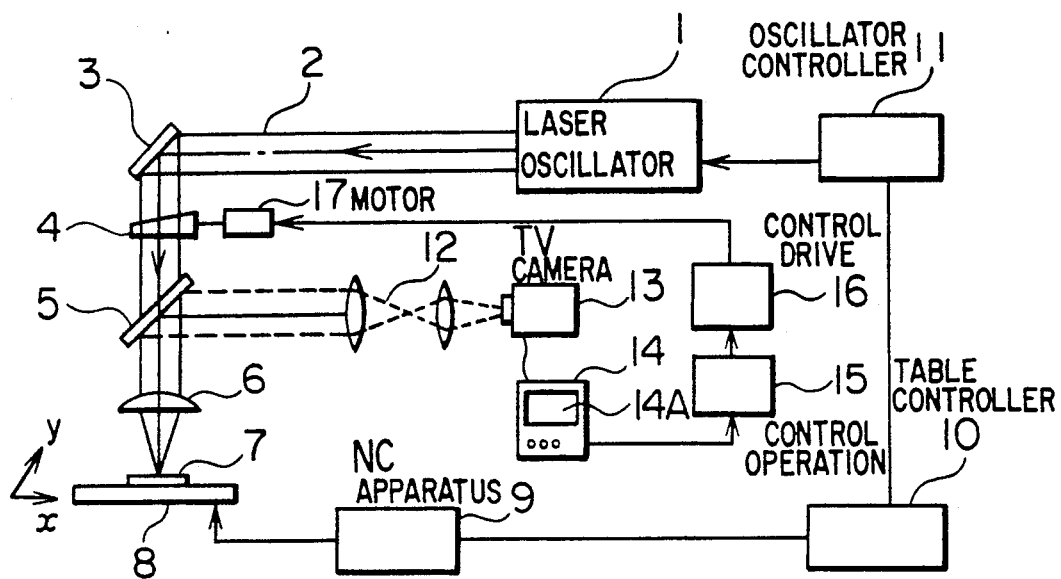
FIGS. 1(A) and 1(B) schematically show an embodiment of the optical path adjusting system according to the present invention.

FIG. 1(A) is a schematic diagram showing an optical path adjusting system which is constituted as follows. A laser beam 2 emitted from a laser oscillator 1 is changed in its direction prependicularly by a bend mirror 3, passed through a wedge prism 4, and then focused on a work 7 by a condenser lens , 6 after passed through a monitor mirror 5. The work 7 is mounted on a machining table 8 which is capable of being moved in the x and y directions by a NC apparatus 9 controlled by a table controller 10. The table controller 10 is connected to the laser oscillator 1 through an oscillator controller 11. Although the table controller 110 and the oscillator controller 11 are provided separately from each other in the illustrated embodiment, it is a matter of course that the two controllers 10 and 11 may be provided in an integrated form.

Figure 1B:
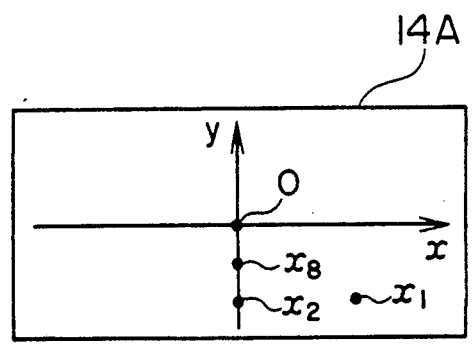

The monitor mirror 5 has a wavelength selecting property for reflecting a wavelength component of light necessary for monitoring so that the status at a working point on the work 7 is displayed as an image on a monitor TV (television receiver set) 14 through an enlarging lens 12 and a TV camera 13. As shown in FIG. 1(B), a picture display screen 14A of the display portion of monitor TV 14 corresponds to the surface of the work 7 so that the coordinates of the x and y axes are displayed on this display portion. The origin of the coordinates represent a reference optical path axis (reference position) 0. The monitor TV 14 is connected to a control operational portion 15.

The control operational portion 15 previously stores data for indicating a positional error of an actually measured position x1 in the directions of the x and y axes from the reference optical path axis in the case where, for example the position of the laser beam displaced from the correct position of irradiation on the picture displaye screen 14A is detected as the position x1, so that the control operational portion 15 supplies a control driving portion 16 with an output signal representing an amount of correction of the erroneous position in the x and y axes. The control operational portion 15 and the control driving portion 16 may be provided in an integrated form. The control driving portion 16 supplies an electric motor 17 with a rotation command so that the inclination of the wedge prism 4 is controlled by the rotation of the electric motor 17 to thereby make the laser beam parallel to the optical axis of the condenser lens 6.

Figure 2:
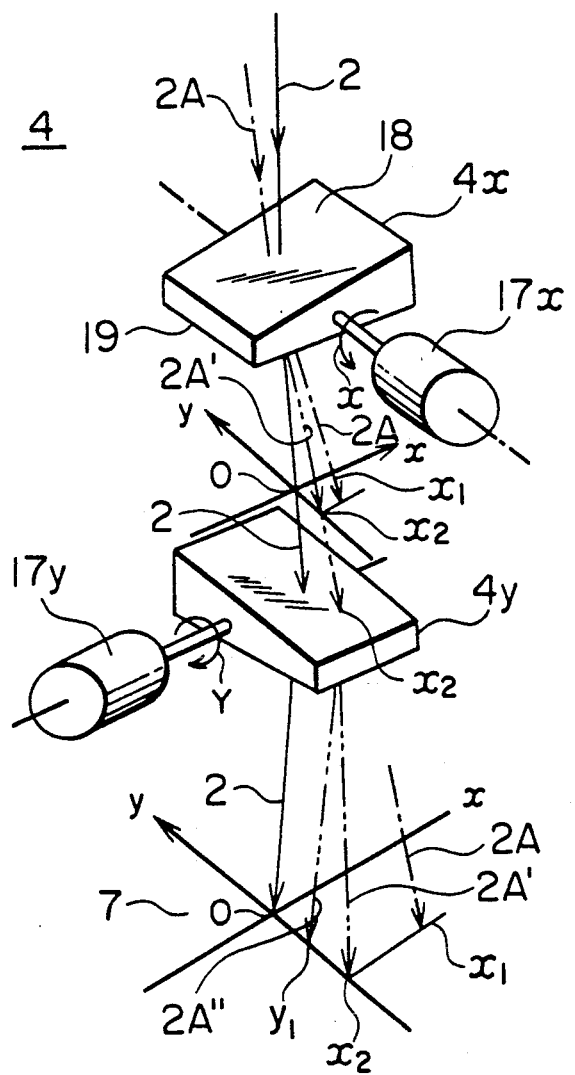
FIG. 2 shows in detail the optical path adjusting mechanism of the system shown in FIG. 1(A)

Referring to FIG. 2, the structure of the wedge prism 4 will be described in detail. The wedge prism 4 is constituted by an x-axis wedge-like mirror 4x and a y-axis wedge prism 4y disposed under the x-axis 4x and in opposition thereto. The x-axis wedge prism 4x and y-axis wedge prism 4y are rotated so that the point of irradiation with the laser beam is displaced in the x and y directions on the surface of the work. The electric motor 17 includes an x-axis electric motor 17x and a y-axis electric motor 17i y so that the x-axis wedge prism 4x and the y-axis wedge-like mirror 4y are supported on the respective output shafts of the x-axis electric motor 17x and the y-axis electric motor 17y. In accordance with the instructions supplied from the control driving portion 16, the x-axis electric motor 17x and the y-axis electric motor 17y rotate forward/backward to rotate the x-axis wedge prism 4x and the y-axis wedge prism 4y about the respective output shafts of the x-axis electric motor 17x and the y-axis electric motor 17y to correct the x and y coordinate positions respectively. Each of the x-axis wedge prism 4x and the y-axis wedge prism 4y has an incidence surface and an outgoing surface which are formed as an inclined surface and a parallel surface respectively. The inclined surface 18 may be formed at either one of the incident and outgoing sides.

Next, the method of optical path adjustment of the optical path adjusting system will be described hereunder.

Figure 3A:
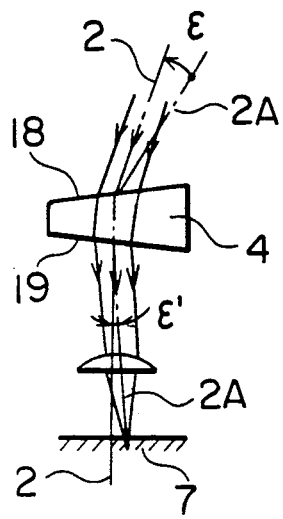
FIGS. 3(A), 3(B) and 3(C) are views for explaining the operation of the optical path adjusting mechanism shown in FIG. 2.
Figure 3B:
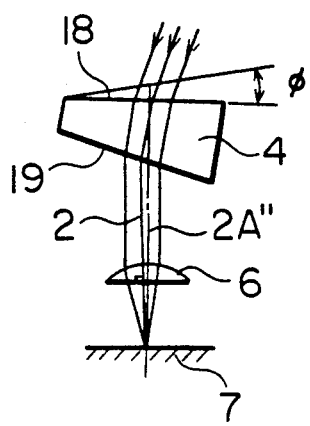

The laser beam 2 irradiates the work 7. The position of irradiation O at this time is made to be the reference optical path axis. The reference optical path axis O has an optical path parallel to the optical axis within the condenser lens 6 as shown in FIGS. 3(A) and 3(B). The optical axis is an axis, for example like the laser beam 2, perpendicular to the under surface of the condenser lens 6. Next, assume that a laser beam 2A irradiates the work 7 under the condition that the laser beam 2A inclined relative to the former laser beam 2 is incident to the wedge prism 4. At this time, the actually measured working position is the position x1 which is displaced from the reference optical path axis O. At this time, the incident angle of the laser beam 2A onto the wedge prism 4 gets out of that of the laser beam 2 by an angle of $\epsilon$ so that the laser beam 2A is not parallel to the optical axis of the condenser lens 6 but inclines as shown in FIG. 3A.

The position of irradiation of the laser beam 2 or 2A is displayed on the picture display screen and supplied to the control operational portion 15. The control operational portion 15 calculates the error of the position of irradiation x1 from the reference optical path axis O to supply the control driving portion 16 with a correction signal for making the laser beam 2A parallel to the optical axis. In response to the correction signal, the control driving portion 16 supplies rotation commands to the x-axis electric motor 17x and the y-axis electric motor 17y respectively.

More specifically, if the x-axis electric motor 17x rotates by an operation angle of $\Phi$ counterclockwise as shown by an arrow X, the laser beam 2A' going out of the x-axis wedge prism 4x is deflected so as to move along the x-axis toward the reference optical path axis with respect to the laser beam 2A so that the position of irradiation x1 moves to an x-axis-corrected working position x2.

Next, if the y-axis electric motor 17y rotates clockwise as shown by an arrow Y, the laser beam 2A" going out of the y-axis wedge prism 4y is deflected so as to move along the y-axis toward the reference optical path axis with respect to the laser beam 2A' so that the x-axis-corrected working position x2 moves to a y-axis-corrected working position y1. At this time, the laser beam 2A" is a laser beam corrected so as to be parallel to the laser beam 2 in the condenser lens 6 as shown in FIG. 3(B). Thus, after passed through the condenser lens 6, the laser beams 2 and 2A parallel to each other in the condenser lens 6 are focused at one point, that is, the reference optical path axis O so that laser working can be performed always at a correct position accurately.

Thus, in the optical path adjusting system according to the present invention, it is possible that the laser beam 2A" is corrected so as to be parallel to the optical axis within the condenser lens 6 so that the laser beam 2A" is reduced in diameter by the condenser lens 6 so as to be focused at a point without scattering. Accordingly, it is possible to make the laser power density high and to perform fine working. Further, since it is sufficient to perform adjustment so as to make the laser beam 2A" parallel to the optical axis within the condenser lens, the adjustment range can be widened in comparison with the conventional technique in which the position of irradiation is made coincident with the reference position, so that the adjustment can be performed easily correspondingly and the tolerance in accuracy of the optical path adjusting mechanism can be widened.

Figure 3C:
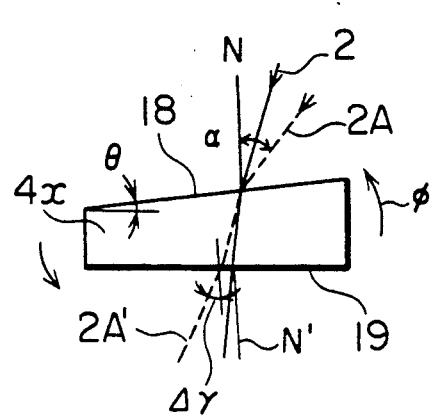
Figure 4:
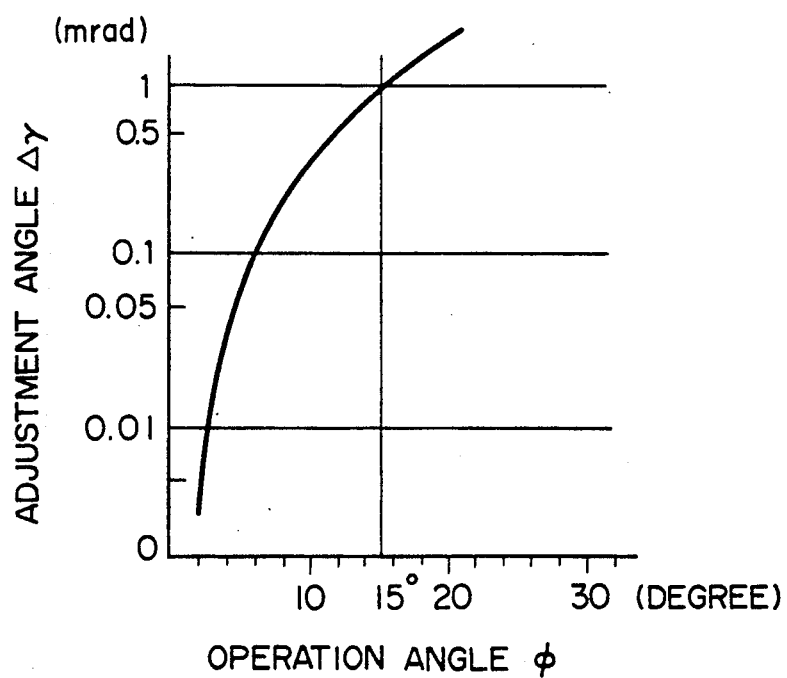
FIG. 4 is a characteristic diagram showing the relation between the operation angle and the adjustment angle in the operation of the optical path adjusting mechanism shown in FIGS. 3(A) to 3(C).

On the other hand, as shown in FIG. 3(c), if the wedge prism is rotated with an operation angle of $\Phi$, the incident laser beam 2 comes out as a laser beam 2A' from the wedge prism. At this time, the adjustment angle at the parallel surface side may be $\Delta\gamma$ which satisfies the condition of $\Phi > \Delta\gamma$. This characteristics will be described with reference to FIG. 4 showing the relation between the operation angle $\Phi$ and the adjustment angle $\Delta\gamma$. For example, when the operation angle $\Phi$ is selected to be 15° (0.262 rad), the adjustment angle $\Delta\gamma$ is 1.0 mrad, and the ratio of the operation angle $\Phi$ to the adjustment angle $\Delta\gamma$ is expressed as $\Phi/\Delta\gamma = 0.262$ (rad)/1 (mrad) $= 0.262 \times 10^3 = 260$. This means that 1 rad of the adjustment angle $\Delta\gamma$ can be enlarged into 260 rad of the operation angle $\Phi$. That is, it is possible to perform fine adjustment of the adjustment angle $\Delta\gamma$ with the enlarged scale of the operation angle $\Phi$. Accordingly, the operation angle $\Phi$ can be easily read so that the operational property is improved. Thus, it is possible to provide an optical path adjusting system which can be used easily. In the drawing, N and N' represent normals respectively.

In use, an operator can move the position of irradiation displayed on the picture display screen to the x-axis correction working position x2 and then to the y-axis correction working position y2 by properly operating the x-axis wedge prism 4x and y-axis wedge prism 4y to thereby obtain the laser beam 2A'' which is parallel to the laser beam 2.

In the above embodiment, a light beam may be used in place of the laser beam.

We claim:

1. An optical path adjusting system comprising:
 a condenser lens to which a light beam is incident;
 wedge prism means displaceably disposed on the incident optical path side of said condenser lens;
 detection means for detecting a position of irradiation of said light beam;
 control means responsive to an irradiation position signal from said detection means for producing an error correction signal representing an error of the position of irradiation relative to a reference position; and
 driving means responsive to said error correction signal from said control means for displacing said wedge prism means so as to make the light beam parallel to an optical axis of said condenser lens;
 wherein said wedge prism means includes an X-axis wedge prism and a y-axis wedge prism disposed in opposition to each other so as to be displaceable in the directions of x and y axes of a surface of a work respectively, said x-axis wedge prism and y-axis wedge prism being displaced in said x and y directions by said driving means, and display means is provided between said detection means and said control means so as to display thereon coordinates of x and y axes of a surface of a work, said reference position and said position of irradiation.

2. An optical path adjusting system according to claim 1, in which said wedge prism means includes an inclined surface formed on selected one of its incident surface side and its outgoing surface side.

3. An optical path adjusting system according to claim 1, in which each of said x-axis wedge prism and y-axis wedge prism includes an inclined surface formed on selected one of its incident surface side and its outgoing surface side.

4. An optical path adjusting system according to claim 1, in which said light beam is a laser beam.

5. An optical path adjusting system according to claim 2, in which said light beam is a laser beam.

6. An optical path adjusting system according to claim 3, in which said light beam is a laser beam.

7. An optical path adjusting method comprising the steps of:
 sending a light beam onto a condenser lens;
 displaceably disposing a wedge prism means on the incident optical path side of said condenser lens;
 detecting a position of irradiation of said light beam by using detection means and supplying a detection output to control means;
 supplying driving means with an error correction signal obtained by said control means and representing an error of the position of irradiation relative to a reference position; and
 displacing said wedge prism means by said driving means so as to make the light beam parallel to an optical axis of said condenser lens;
 wherein said step of displaceably disposing a wedge prism means icludes the step of disposing an x-axis wedge prism and a y-axis wedge prism in opposition to each other so as to be displaceable in the direction of x and y axes of a surface of a work respectively, so that said x-axis wedge prism and y-axis wedge prism are displaced by said driving means to thereby make the light beam parallel to the optical axis of said condenser lens; and
 further comprising the steps of:
 displaying the reference position and the position of irradiation inputted from said detection means on display means displaying coordinates of x and y axes of a surface of a work; and
 supplying said driving means with an error correction value obtained in said control means to correct the error of the position of irradiation from the reference position.

8. An optical path adjusting method according to claim 7, in which said light beam is a laser beam.

9. An optical path adjusting system comprising:
 a condenser lens to which a light beam is incident;
 wedge prism means displaceably disposed on the incident optical path side of said condenser lens, said wedge prism means including an x-axis wedge prism and a y-axis wedge prism disposed in opposition to each other so as to be displaceable in the directions of x and y axes of a surface of a work respectively;
 detection means for detecting a position of irradiation of said light beam on said condenser lens;
 control means responsive to an irradiation position signal from said detection means for producing an error correction signal representing an error of the position of irradiation relative to a reference position;
 driving means responsive to said error correction signal from said control means for displacing said x-axis wedge prism and said y-axis wedge prism in said x-axis and y-axis directions respectively to thereby make the light beam parallel to an optical axis of said condenser lens; and
 display means provided between said detection means and said control means for displaying thereon coordinates of the x and y axes of said work surface, said reference position, and said position of irradiation.

10. An optical path adjusting system according to claim 9, in which said light beam is a laser beam.

11. An optical path adjusting method comprising the steps of:

sending a light beam onto a condenser lens;

disposing, on the incident optical path side of said condenser lens, an x-axis wedge prism and a y-axis wedge prism in opposition to each other so as to be displaceable in the directions of x and y axes of a surface of a work respectively;

detecting a position of irradiation of said light beam on said condenser lens by using detection means and supplying control means with the detected position;

supplying driving means with an error correction signal representing an error of the position of irradiation relative to a reference position;

displacing said x-axis wedge prism and said y-axis wedge prism in said x and y directions respectively by said driving means to thereby make the light beam parallel to an optical axis of said condenser lens; and displaying coordinates of the x and y axes of said work surface, said reference position, and said position of irradiation.

12. An optical path adjusting method according to claim 11, in which said light beam is a laser beam.

* * * * *